US012809634B2

(12) United States Patent
Abulila et al.

(10) Patent No.: US 12,809,634 B2
(45) Date of Patent: Nov. 24, 2026

(54) PERFORMING STORAGE-FREE INSTRUCTION CACHE HIT PREDICTION IN A PROCESSOR

(71) Applicant: Microsoft Technology Licensing, LLC, Redmond, WA (US)

(72) Inventors: Ahmed Abulila, Raleigh, NC (US); Rami Mohammad Al Sheikh, Morrisville, NC (US); Daren Eugene Streett, Cary, NC (US); Michael Scott Mcilvaine, Raleigh, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 111 days.

(21) Appl. No.: 18/083,185

(22) Filed: Dec. 16, 2022

(65) Prior Publication Data

US 2024/0201998 A1 Jun. 20, 2024

(51) Int. Cl.

*G06F 9/38* (2018.01)
*G06F 12/0811* (2016.01)
*G06F 12/0875* (2016.01)

(52) U.S. Cl.

CPC ........ *G06F 9/3806* (2013.01); *G06F 12/0811* (2013.01); *G06F 12/0875* (2013.01); *G06F 2212/27* (2013.01); *G06F 2212/452* (2013.01)

(58) Field of Classification Search

None
See application file for complete search history.

(56) References Cited

U.S. PATENT DOCUMENTS

| | | | | |
|---|---|---|---|---|
| 2013/0246708 A1* | 9/2013 | Ono | .................... | G06F 12/0862 711/E12.024 |
| 2019/0294546 A1* | 9/2019 | Agarwal | ............... | G06F 3/0611 |
| 2020/0004543 A1* | 1/2020 | Kumar | .................... | G06F 9/323 |
| 2020/0065106 A1 | 2/2020 | Kalamatianos | | |
| 2021/0004233 A1* | 1/2021 | Kumar | .................. | G06F 9/3858 |

OTHER PUBLICATIONS

Kumar, et al., "Blasting Through The Front-End Bottleneck With Shotgun", In Proceedings of the Twenty-Third International Conference on Architectural Support for Programming Languages and Operating Systems, Mar. 24, 2018, pp. 30-42.

Reinman, et al., "A Scalable Front-End Architecture for Fast Instruction Delivery", In Proceedings of the 26th Annual International Symposium on Computer Architecture, May 2, 1999, pp. 234-245.

(Continued)

*Primary Examiner* — John M Lindlof

(57) ABSTRACT

Performing storage-free instruction cache hit prediction is disclosed herein. In some aspects, a processor comprises an instruction cache hit prediction circuit that is configured to detect that a first access by a branch predictor circuit to a branch target buffer (BTB) for a first instruction in an instruction stream results in a miss on the BTB. In response to detecting the miss, the instruction cache hit prediction circuit is further configured to generate a first instruction cache prefetch request for the first instruction. The instruction cache hit prediction circuit is also configured to transmit the first instruction cache prefetch request to a prefetcher circuit.

20 Claims, 6 Drawing Sheets

(56) References Cited

OTHER PUBLICATIONS

Reinman, et al., "Fetch Directed Instruction Prefetching", In Proceedings of the 32nd Annual IEEE/ACM International Symposium on Microarchitecture, Nov. 16, 1999, pp. 1-12.
International Search Report and Written Opinion received for PCT Application No. PCT/US2023/035655, Feb. 19, 2024, 15 pages.
Burcea, Ioana et al: "Phantom—BTB", PLDI 09: Proceedings of The 2009 ACM SIGPLAN Conference on Programming Language Design and Implementation; a Monthly Publication of the Special Interest Group on Programming Languages, vol. 44, Issue No. 3, Mar. 7, 2009, pp. 313-324.

* cited by examiner

PERFORMING STORAGE-FREE INSTRUCTION CACHE HIT PREDICTION IN A PROCESSOR

FIELD OF THE DISCLOSURE

The technology of this disclosure relates to processing of instructions for execution in a microprocessor ("processor"), and, in particular, to prefetching instructions in a processor.

BACKGROUND

Processor-based devices perform computational tasks for a wide variety of applications. A conventional processor-based device includes a processor, often referred to as a central processing unit (CPU), that executes computer program instructions to perform data-based operations and generate a result. The result may then be stored using a memory, provided as an output to an input/output ("I/O") device, or made available (i.e., communicated) as an input value to another instruction executed by the processor, as non-limiting examples.

To increase processor performance, a processor may employ a technique known as instruction pipelining, whereby the throughput of computer program instructions being executed may be increased by dividing the processing of each instruction into a series of steps which are then executed within an execution pipeline that is composed of multiple stages. Optimal processor performance may be achieved if the processor can fetch the proper instructions from memory quickly enough to allow all stages in the execution pipeline to process instructions concurrently and sequentially as the instructions are ordered in the execution pipeline.

The speed with which a processor can fetch the instructions may be limited by the memory access latency of the processor. "Memory access latency" refers to an interval between the time the processor initiates a memory access request for data (i.e., to fetch an instruction for execution), and the time the processor actually receives the requested data. Memory access latency may negatively affect processor performance if the time interval is large enough that the processor is forced to stall further execution of instructions while waiting for the memory access request to be fulfilled. The effects of memory access latency may be minimized through the use of cache memory, also referred to simply as "cache," which is a memory device that has a smaller capacity than system memory, but that can be accessed faster by a processor due to the type of memory used and/or the physical location of the cache relative to the processor. The cache can be used to reduce memory access latency by storing copies of data retrieved from frequently accessed memory locations in the system memory or from another, higher-level cache (i.e., a cache further from the processor).

Modern processor-based devices employ a memory hierarchy that includes system memory along with multiple levels of cache memory located between the system memory and the processor. Levels of cache memory that are closer to the processor (i.e., lower-level caches) have faster access times and smaller storage capacities, while levels of cache memory that are further from the processor have slower access times and larger storage capacities. When a memory access request is received from the processor, the first level cache (i.e., the smallest, fastest cache that is located closest to the processor) is queried to see if the requested data is stored therein. If not, the memory access request is forwarded to the next higher cache level in the memory hierarchy (and possibly to the system memory), which may result in increased memory access latency.

The memory hierarchy of the processor may include an instruction cache memory, in which frequently executed instructions may be stored and subsequently retrieved for execution. However, because processors generally fetch instructions in program order, a request to fetch an instruction that results in a miss in the instruction cache may cause a stall in the processor's execution pipeline until the instruction can be retrieved from the processor's memory subsystem.

SUMMARY

Aspects disclosed herein include performing storage-free instruction cache hit prediction in a processor. In one exemplary aspect, the processor includes a branch predictor circuit that comprises an instruction cache hit prediction circuit. The instruction cache hit prediction circuit is configured to detect that an access by the branch predictor circuit to a branch target buffer (BTB) for an instruction results in a miss on the BTB (e.g., a miss on each BTB level of a plurality of BTB levels of the BTB, as a non-limiting example). In response, the instruction cache hit prediction circuit generates an instruction cache prefetch request for the instruction, and transmits the instruction cache prefetch request to a prefetcher circuit of the processor, which may then perform a prefetch into an instruction cache memory (e.g., from a Level 2 (L2) cache memory of the processor). By leveraging the larger instruction history provided by the BTB relative to the instruction cache memory, the instruction cache hit prediction circuit can predict hits and misses on the instruction cache memory and preemptively issue prefetch requests in response to predicted misses, without requiring the tracking or storage of additional instruction metadata.

In some aspects, the BTB may provide an instruction cache hit counter and an instruction cache miss counter for each BTB level of the plurality of BTB levels of the BTB. The instruction cache hit prediction circuit in such aspects may be configured to detect whether an access by the branch predictor circuit to a BTB level for an instruction in the instruction stream results in a hit on the instruction cache memory. If so, the instruction cache hit prediction circuit increments the instruction cache hit counter for that BTB level, and otherwise increments the instruction cache miss counter for that BTB level. The instruction cache hit prediction circuit subsequently determines a ratio of a value of the instruction cache hit counter for the BTB level to a value of the instruction cache miss counter for the BTB level. In the case of a miss on the BTB level, if the ratio exceeds a miss rate threshold, the instruction cache hit prediction circuit generates an instruction cache prefetch request for the instruction, and transmits the instruction cache prefetch request to the prefetcher circuit. In some aspects, the instruction cache hit prediction circuit may subsequently reset the instruction cache hit counter and the instruction cache miss counter for the BTB level (e.g., after expiration of a predefined time interval or after execution of a predefined number of instructions, as non-limiting examples).

In this regard, in another exemplary aspect, a processor for performing storage-free instruction cache hit prediction is disclosed. The processor comprises an instruction processing circuit configured to process an instruction stream comprising a plurality of instructions, a prefetcher circuit, and a branch predictor circuit comprising a BTB and an instruction cache hit prediction circuit. The instruction cache hit prediction circuit is configured to detect that a first access by the branch predictor circuit to the BTB for a first instruction in the instruction stream results in a miss on the BTB. The instruction cache hit prediction circuit is further configured to, responsive to detecting that the first access by the branch predictor circuit to the BTB for the first instruction in the instruction stream results in the miss on the BTB, generate a first instruction cache prefetch request for the first instruction. The instruction cache hit prediction circuit is also configured to transmit the first instruction cache prefetch request to the prefetcher circuit.

In another exemplary aspect, a method for performing storage-free instruction cache hit prediction is disclosed. The method comprises detecting, by an instruction cache hit prediction circuit of a processor, that a first access by a branch predictor circuit of the processor to a BTB for a first instruction in an instruction stream results in a miss on the BTB. The method further comprises, responsive to detecting that the first access by the branch predictor circuit to the BTB for the first instruction in the instruction stream results in the miss on the BTB, generating, by the instruction cache hit prediction circuit, a first instruction cache prefetch request for the first instruction. The method also comprises transmitting, by the instruction cache hit prediction circuit, the first instruction cache prefetch request to a prefetcher circuit of the processor.

In another exemplary aspect, a non-transitory computer-readable medium is disclosed. The non-transitory computer-readable medium stores computer-executable instructions that, when executed, cause a processor to detect that a first access by a branch predictor circuit of the processor to a BTB for a first instruction in an instruction stream results in a miss on the BTB. The computer-executable instructions further cause the processor to, responsive to detecting that the first access by the branch predictor circuit to the BTB for the first instruction in the instruction stream results in the miss on the BTB, generate a first instruction cache prefetch request for the first instruction. The computer-executable instructions also cause the processor to transmit the first instruction cache prefetch request to a prefetcher circuit of the processor.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
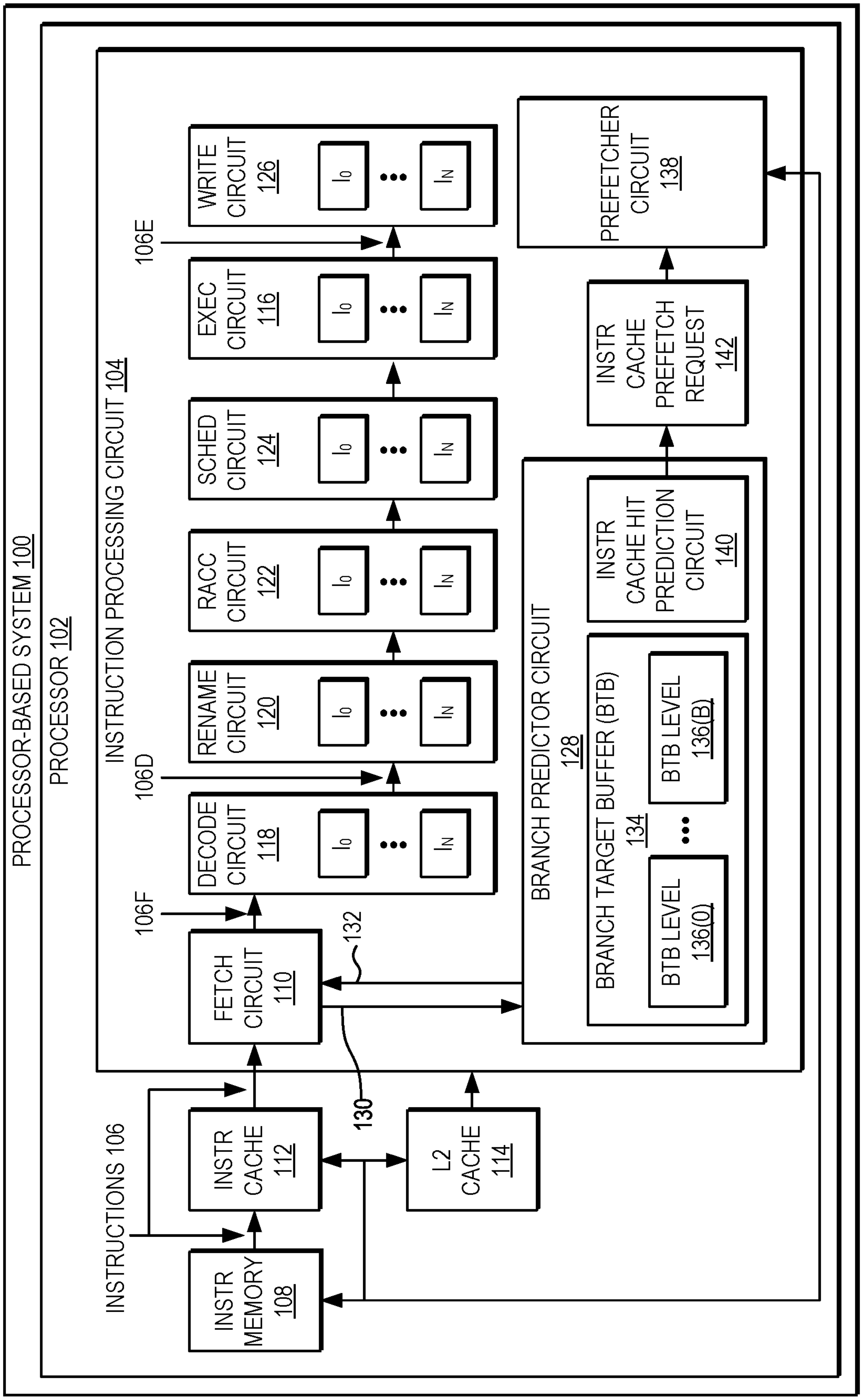
FIG. 1 is a diagram of an exemplary processor-based system that includes a processor comprising an instruction processing circuit that includes an instruction cache hit prediction circuit configured to perform storage-free instruction cache hit prediction, according to some aspects.
Figure 2:
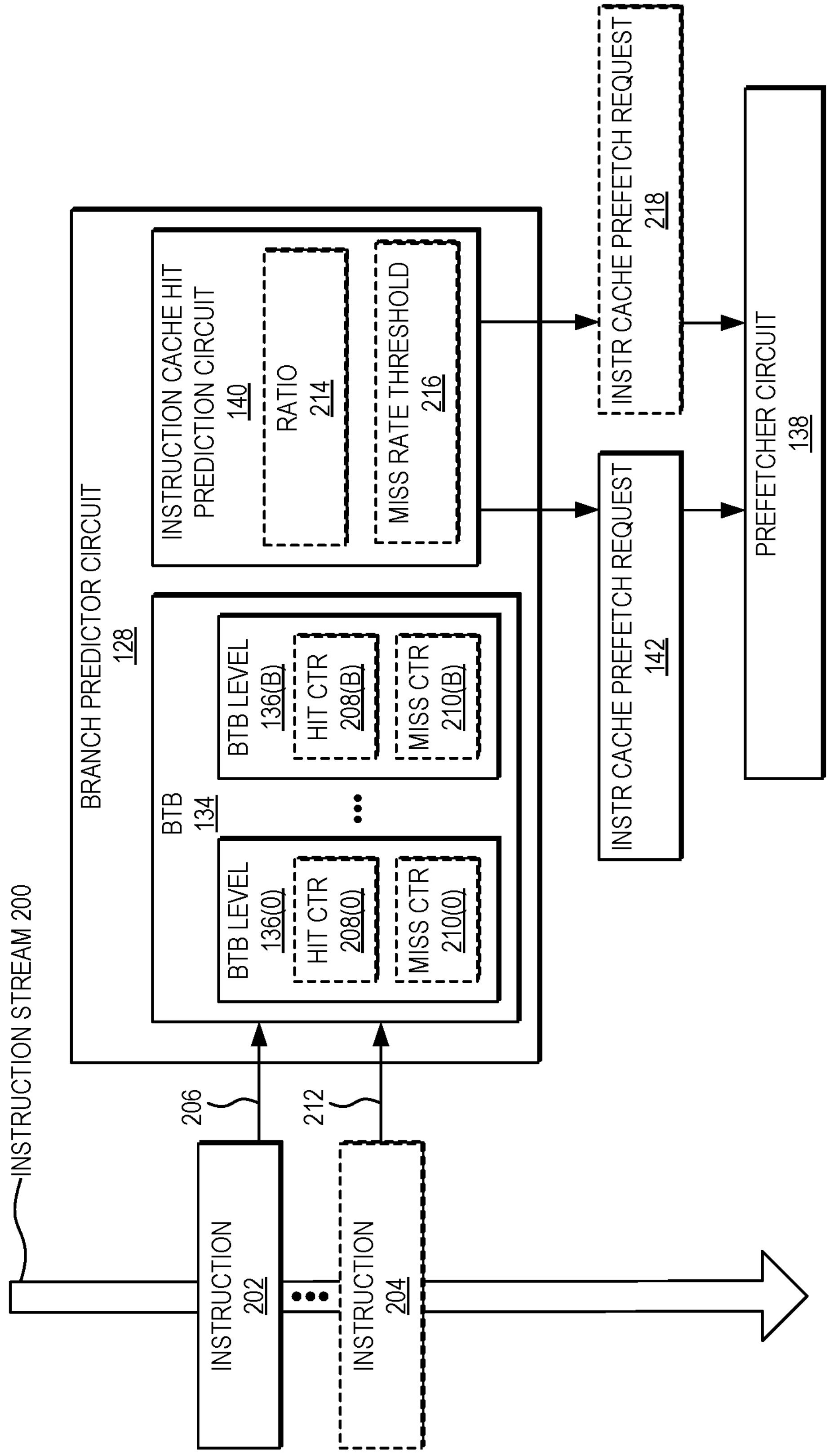
FIG. 2 illustrates exemplary aspects of the instruction cache hit prediction circuit of FIG. 1 in greater detail.
Figure 4A:
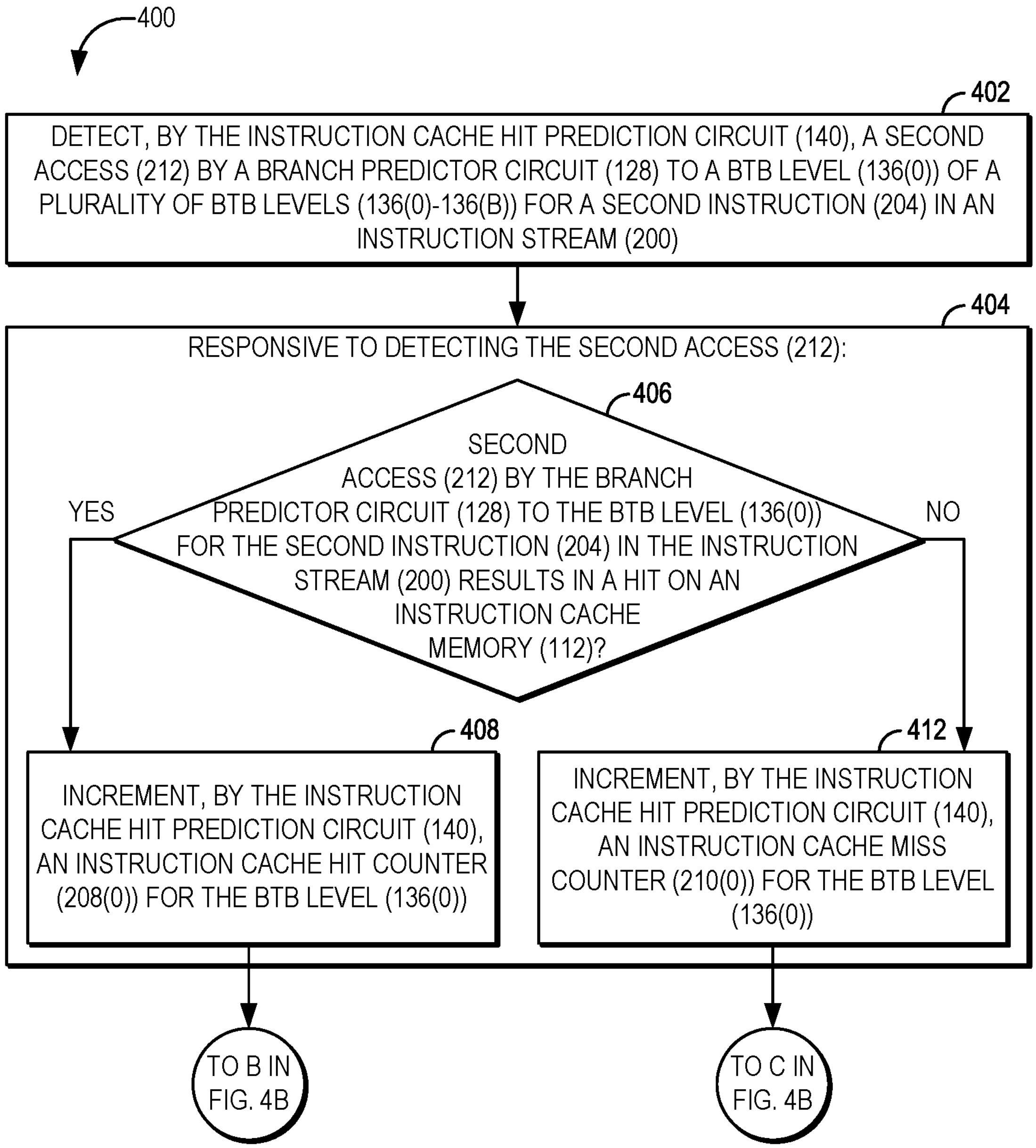
Figure 4B:
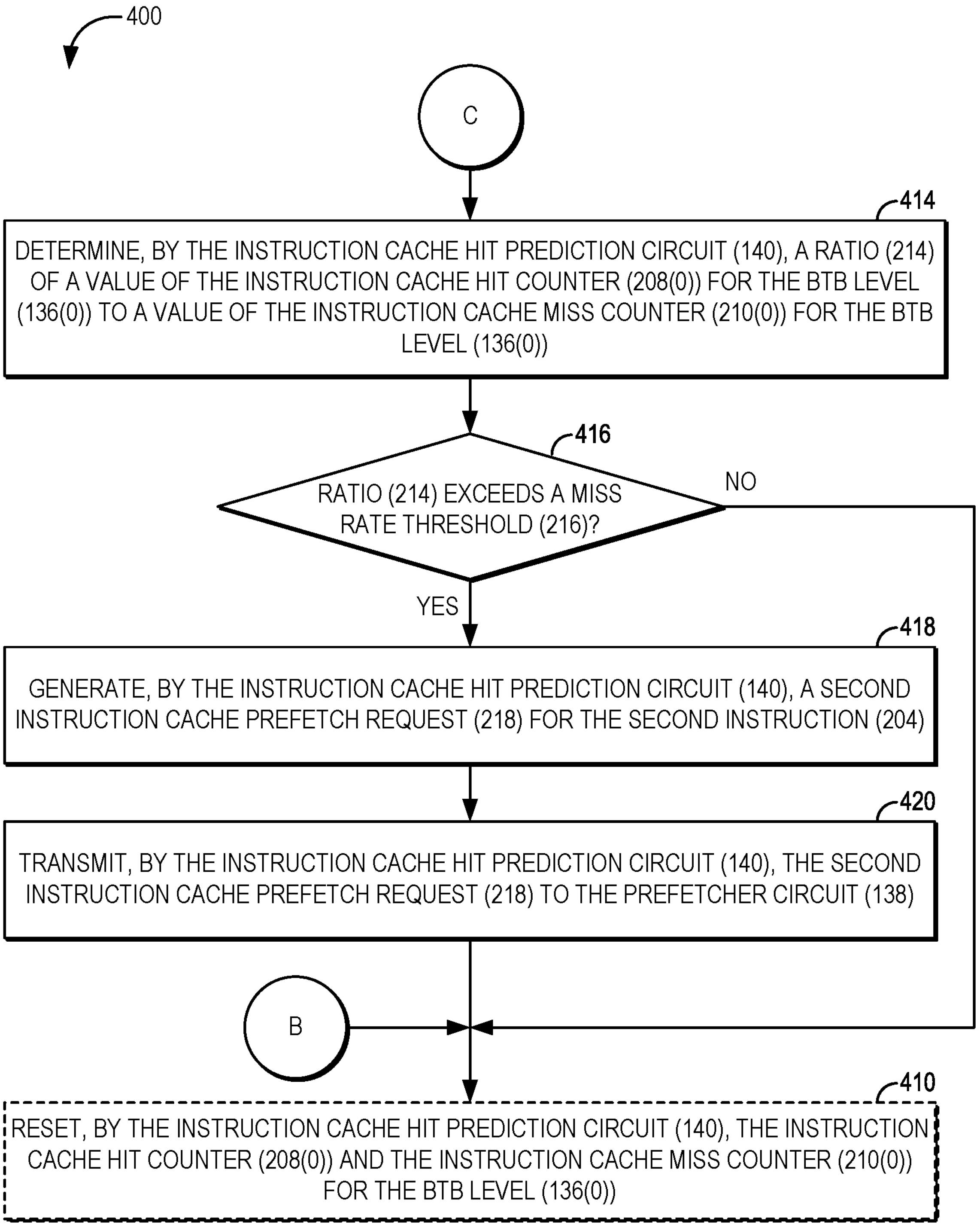
Figure 5:
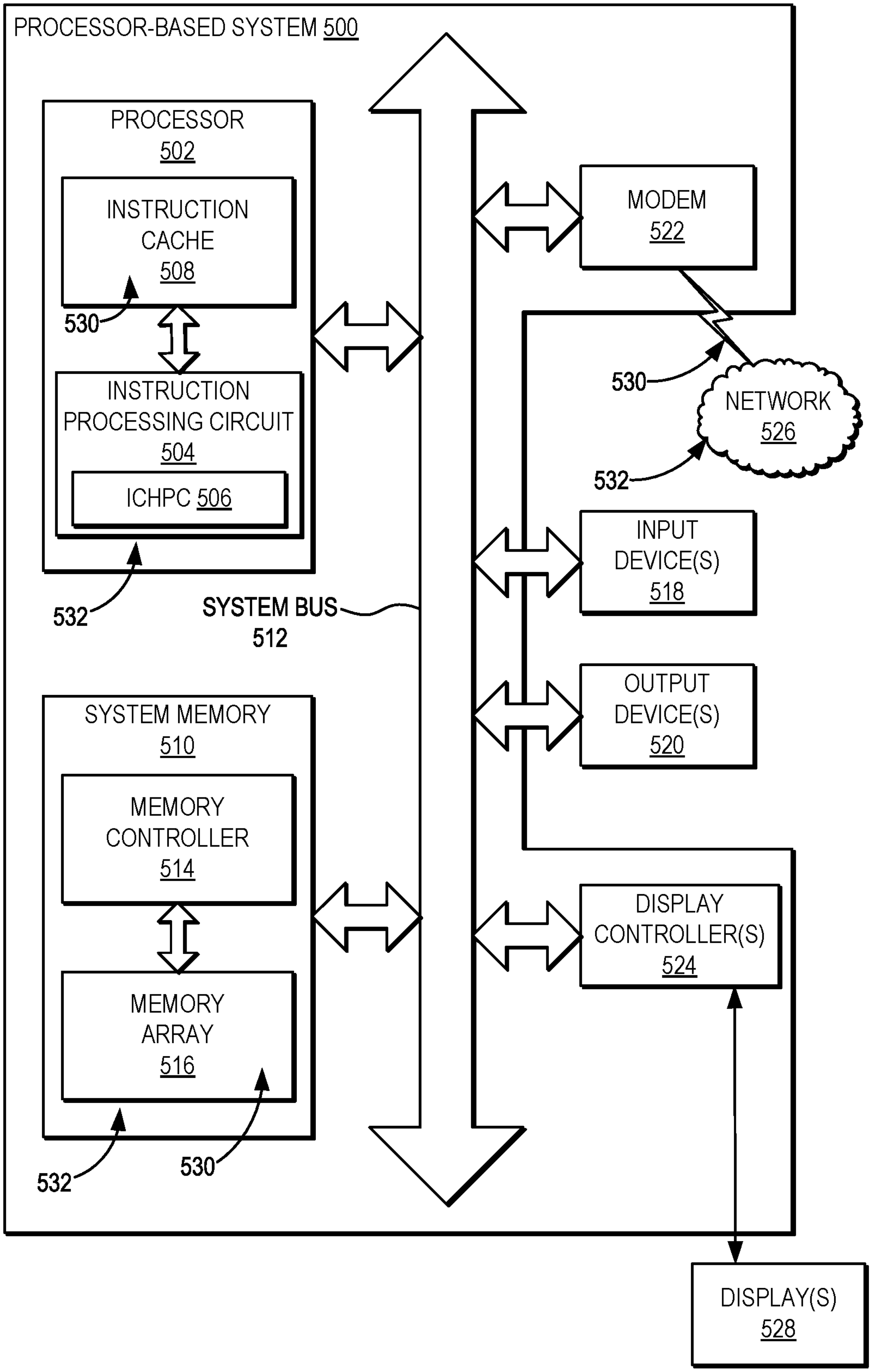

FIGS. 4A-4B is a flowchart illustrating additional exemplary operations for employing instruction cache hit and miss counters when generating prefetch requests by the instruction cache hit prediction circuit of FIGS. 1 and 2, according to some aspects; and FIG. 5 is a block diagram of an exemplary processor-based system that includes a processor with an instruction processing circuit, such as the instruction processing circuit of FIG. 1, that includes an instruction cache hit prediction circuit for performing storage-free instruction cache hit prediction.

DETAILED DESCRIPTION

Aspects disclosed herein include performing storage-free instruction cache hit prediction in a processor. In one exemplary aspect, the processor includes a branch predictor circuit that comprises an instruction cache hit prediction circuit. The instruction cache hit prediction circuit is configured to detect that an access by the branch predictor circuit to a branch target buffer (BTB) for an instruction results in a miss on the BTB (e.g., a miss on each BTB level of a plurality of BTB levels of the BTB, as a non-limiting example). In response, the instruction cache hit prediction circuit generates an instruction cache prefetch request for the instruction, and transmits the instruction cache prefetch request to a prefetcher circuit of the processor, which may then perform a prefetch into an instruction cache memory (e.g., from a Level 2 (L2) cache memory of the processor). By leveraging the larger instruction history provided by the BTB relative to the instruction cache memory, the instruction cache hit prediction circuit can predict hits and misses on the instruction cache memory and preemptively issue prefetch requests in response to predicted misses, without requiring the tracking or storage of additional instruction metadata.

In some aspects, the BTB may provide an instruction cache hit counter and an instruction cache miss counter for each BTB level of the plurality of BTB levels of the BTB. The instruction cache hit prediction circuit in such aspects may be configured to detect whether an access by the branch predictor circuit to a BTB level for an instruction in the instruction stream results in a hit on the instruction cache memory. If so, the instruction cache hit prediction circuit increments the instruction cache hit counter for that BTB level, and otherwise increments the instruction cache miss counter for that BTB level. The instruction cache hit prediction circuit subsequently determines a ratio of a value of the instruction cache hit counter for the BTB level to a value of the instruction cache miss counter for the BTB level. In the case of a miss on the BTB level, if the ratio exceeds a miss rate threshold, the instruction cache hit prediction circuit generates an instruction cache prefetch request for the instruction, and transmits the instruction cache prefetch request to the prefetcher circuit. In some aspects, the instruction cache hit prediction circuit may subsequently reset the instruction cache hit counter and the instruction cache miss counter for the BTB level (e.g., after expiration of a predefined time interval or after execution of a predefined number of instructions, as non-limiting examples).

In this regard, FIG. 1 is a diagram of an exemplary processor-based system 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based system 100. In the example of FIG. 1, the processor 102 includes an instruction processing circuit 104 that includes one or more instruction pipelines $I_0$-$I_N$ for processing instructions 106 fetched from an instruction memory (captioned as "INSTR MEMORY" in FIG. 1) 108 by a fetch circuit 110 for execution. The instruction memory 108 may be provided in or as part of a system memory in the processor-based system 100, as a non-limiting example. An instruction cache memory (captioned as "INSTR CACHE" in FIG. 1) 112 may also be provided in the processor 102 to cache the instructions 106 fetched from the instruction memory 108 to reduce latency in the fetch circuit 110. The processor 102 may further provide a L2 cache memory (captioned as "L2 CACHE" in FIG. 1) 114, in which frequently accessed instructions and/or data may be cached. In the example of FIG. 1, the instruction cache memory 112 comprises a first-level cache that has a faster access speed and a smaller capacity than the L2 cache memory 114, which represents a next-higher-level cache. The instruction cache memory 112, the L2 cache memory 114, and the instruction memory 108 together make up a memory hierarchy of the processor 102.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned as "EXEC CIRCUIT" in FIG. 1) 116 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 116.

With continuing reference to FIG. 1, the instruction processing circuit 104 includes a decode circuit 118 configured to decode the fetched instructions 106F fetched by the fetch circuit 110 into decoded instructions 106D to determine the instruction type and actions required. The instruction type and action required encoded in the decoded instruction 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 120 in the instruction processing circuit 104. The rename circuit 120 is configured to determine if any register names in the decoded instructions 106D should be renamed to decouple any register dependencies that would prevent parallel or out-of-order processing.

The instruction processing circuit 104 in the processor 102 in FIG. 1 also includes a register access circuit (captioned as "RACC CIRCUIT" in FIG. 1) 122. The register access circuit 122 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 116. The register access circuit 122 is also configured to provide the retrieved produced value from an executed instruction 106E as the source register operand of a decoded instruction 106D to be executed.

Also, in the instruction processing circuit 104, a scheduler circuit (captioned as "SCHED CIRCUIT" in FIG. 1) 124 is provided in the instruction pipeline $I_0$-$I_N$ and is configured to store decoded instructions 106D in reservation entries until all source register operands for the decoded instruction 106D are available. The scheduler circuit 124 issues decoded instructions 106D that are ready to be executed to the execution circuit 116. A write circuit 126 is also provided in the instruction processing circuit 104 to write back or commit produced values from executed instructions 106E to memory (such as the PRF), cache memory, or system memory.

With continuing reference to FIG. 1, the instruction processing circuit 104 also includes a branch predictor circuit 128. The branch predictor circuit 128 is configured to speculatively predict the outcome of a fetched branch instruction that controls whether instructions corresponding to a taken path or a not-taken path in the instruction control flow path are fetched into the instruction pipelines $I_0$-$I_N$ for execution. For example, the fetched branch instruction may be a branch instruction 130 that includes a condition to be resolved by the instruction processing circuit 104 to determine which instruction control flow path should be taken. In this manner, the outcome of the branch instruction 130 in this example does not have to be resolved in execution by the execution circuit 116 before the instruction processing circuit 104 can continue processing fetched instructions 106F. The prediction made by the branch predictor circuit 128 can be provided as a branch prediction 132 to the fetch circuit 110 to be used to determine the next instructions 106 to fetch as the fetched instructions 106F.

To decouple branch prediction from instruction retrieval operations, the branch predictor circuit 128 of FIG. 1 provides a branch target buffer (BTB) 134 that enables the branch predictor circuit 128 to follow branches that it predicts to be taken without accessing the instruction cache memory 112. To accomplish this, the BTB 134 stores a plurality of BTB entries (not shown) that store information for instructions that have been executed and retired by the instruction processing circuit 104, including information for branch instructions and corresponding branch targets. When generating a branch prediction, the branch predictor circuit 128 may access the BTB 134 using a program counter (PC) of a branch instruction, and, if the access to the BTB 134 results in a hit, can use the branch target information stored in the BTB 134 to determine the next instructions 106 to fetch as the fetched instructions 106F. The BTB 134 of FIG. 1 is organized as a plurality of BTB levels 136(0)-136(B), each of which may comprise a cache memory, with lower BTB levels of the plurality of BTB levels 136(0)-136(B) having a smaller capacity and a faster access time that higher BTB levels of the plurality of BTB levels 136(0)-136(B). In this manner, the BTB levels 136(0)-136(B) operate in a fashion analogous to the memory hierarchy of the processor 102. The capacity of the BTB 134 as a whole may be such that the BTB 134 can store information for a number of instructions that is an order of magnitude or greater than a number of instructions that can be stored in the instruction cache memory 112.

The instruction processing circuit 104 further includes a prefetcher circuit 138 that is configured to fetch instructions or data from a higher-level cache memory such as the L2 cache memory 114 (or from the instruction memory 108) and place it into a lower-level cache memory such as the instruction cache memory 112 before the instructions or data are actually requested by the processor. In some aspects, the prefetcher circuit 138 tracks memory access patterns to identify correlations between a current memory access request and previous memory access requests or processor activities. Once the prefetcher circuit 138 correlates a previously accessed memory address (i.e., the "trigger") with a memory address being currently accessed (i.e., the "target"), subsequent occurrences of memory access requests to the trigger address will cause the prefetcher to retrieve the data stored at the target memory address. The prefetcher circuit 138 thus can reduce memory access latency that can result due to a miss on a lower-level cache memory.

As noted above, the instruction cache memory 112 stores frequently executed instructions for subsequent retrieval and execution. However, because the processor 102 generally fetches the instructions 106 in program order, a request to fetch an instruction that results in a miss in the instruction cache memory 112 may cause a stall in the processor 102 until the instruction can be retrieved from the instruction memory 108. Accordingly, in this regard, the branch predictor circuit 128 provides an instruction cache hit prediction circuit (captioned as "INSTR CACHE HIT PREDICTION CIRCUIT" in FIG. 1) 140. The instruction cache hit prediction circuit 140 of FIG. 1 leverages the relative larger instruction history provided by the BTB 134 to predict hits and misses on the instruction cache memory 112, and preemptively issue instruction cache prefetch requests in response to predicted misses.

In exemplary operation, the instruction cache hit prediction circuit 140 detects that an access by the branch predictor circuit 128 to the BTB 134 for an instruction (not shown) results in a miss on the BTB 134 (e.g., a miss on each BTB level of the plurality of BTB levels 136(0)-136(B), as a non-limiting example). In response, the instruction cache hit prediction circuit 140 generates an instruction cache prefetch request (captioned as "INSTR CACHE PREFETCH REQUEST" in FIG. 1) 142 for the instruction, and transmits the instruction cache prefetch request 142 to the prefetcher circuit 138, which may then perform a prefetch into the instruction cache memory 112 (e.g., from the L2 cache memory 114 of the processor 102). In this manner, the instruction cache hit prediction circuit 140 can use the BTB 134 as a proxy to predict misses on the instruction cache memory 112, without requiring the tracking or storage of additional instruction metadata.

To illustrate exemplary elements of and operations performed by the instruction cache hit prediction circuit 140 of FIG. 1, FIG. 2 is provided. As seen in FIG. 2, an instruction stream 200 comprising instructions 202 and 204 is being executed (e.g., by the instruction processing circuit 104 of FIG. 1). Also shown in FIG. 2 are the branch predictor circuit 128, the BTB 134, the prefetcher circuit 138, and the instruction cache hit prediction circuit 140 of FIG. 1. In the example of FIG. 2, the branch predictor circuit 128 performs an access 206 to the BTB 134 for the instruction 202 (e.g., where the instruction 202 is a branch instruction and the branch predictor circuit 128 is consulting the BTB 134 in an attempt to identify a branch target for the instruction 202). The instruction cache hit prediction circuit 140 detects that the access 206 results in a miss on the BTB 134 (i.e., because the instruction 202 has not been previously executed and retired, or because previously stored information for the instruction 202 has been evicted from the BTB 134). In some aspects, the instruction cache hit prediction circuit 140 may detect that the access 206 resulted in a miss by determining that the access 206 resulted in a miss on each BTB level of the BTB levels 136(0)-136(B). In response to detecting that the access 206 resulted in a miss on the BTB 134, the instruction cache hit prediction circuit 140 generates the instruction cache prefetch request 142 for the instruction 202, and transmits the instruction cache prefetch request 142 to the prefetcher circuit 138. The instruction cache prefetch request 142 may specify, e.g., a memory address of the instruction 202 from which data will be prefetched into the instruction cache memory 112 of FIG. 1 by the prefetcher circuit 138.

Some aspects may provide that the instruction cache hit prediction circuit 140, in addition to or as an alternative to generating the instruction cache prefetch request 142 in response to detecting a miss on the BTB 134, may determine whether to trigger a prefetch based on a miss rate on the instruction cache memory 112 of FIG. 1. In such aspects, each of the plurality of BTB levels 136(0)-136(B) of the BTB 134 is associated with a corresponding instruction cache hit counter (captioned as "HIT CTR" in FIG. 2) 208(0)-208(B) and a corresponding instruction cache miss counter (captioned as "MISS CTR" in FIG. 2) 210(0)-210(B). The instruction cache hit prediction circuit 140 in such aspects is configured to detect whether an access 212 by the branch predictor circuit 128 to, e.g., the BTB level 136(0) for the instruction 204 in the instruction stream 200 results in a hit on the instruction cache memory 112 (i.e., whether the instruction 204 for which the branch predictor circuit 128 performs the access 212 to the BTB level 136(0) is also found to be stored in the instruction cache memory 112). If so, the instruction cache hit prediction circuit 140 increments the instruction cache hit counter 208(0) for the BTB level 136(0), and otherwise increments the instruction cache miss counter 210(0) for the BTB level 136(0).

In the case of a miss on the BTB level 136(0), the instruction cache hit prediction circuit 140 may subsequently determine a ratio 214 of a value of the instruction cache hit counter 208(0) for the BTB level 136(0) to a value of the instruction cache miss counter 210(0) for the BTB level 136(0). If the ratio 214 exceeds a miss rate threshold 216, the instruction cache hit prediction circuit 140 generates an instruction cache prefetch request (captioned as "INSTR CACHE PREFETCH REQUEST" in FIG. 2) 218 for the instruction 204, and transmits the instruction cache prefetch request 218 to the prefetcher circuit 138. In some aspects, the instruction cache hit prediction circuit 140 may subsequently reset the instruction cache hit counter 208(0) and the instruction cache miss counter 210(0) for the BTB level 136(0). For example, the instruction cache hit prediction circuit 140 may reset the instruction cache hit counter 208(0) and the instruction cache miss counter 210(0) for the BTB level 136(0) after expiration of a predefined time interval or after execution of a predefined number of instructions, as non-limiting examples.

Figure 3:
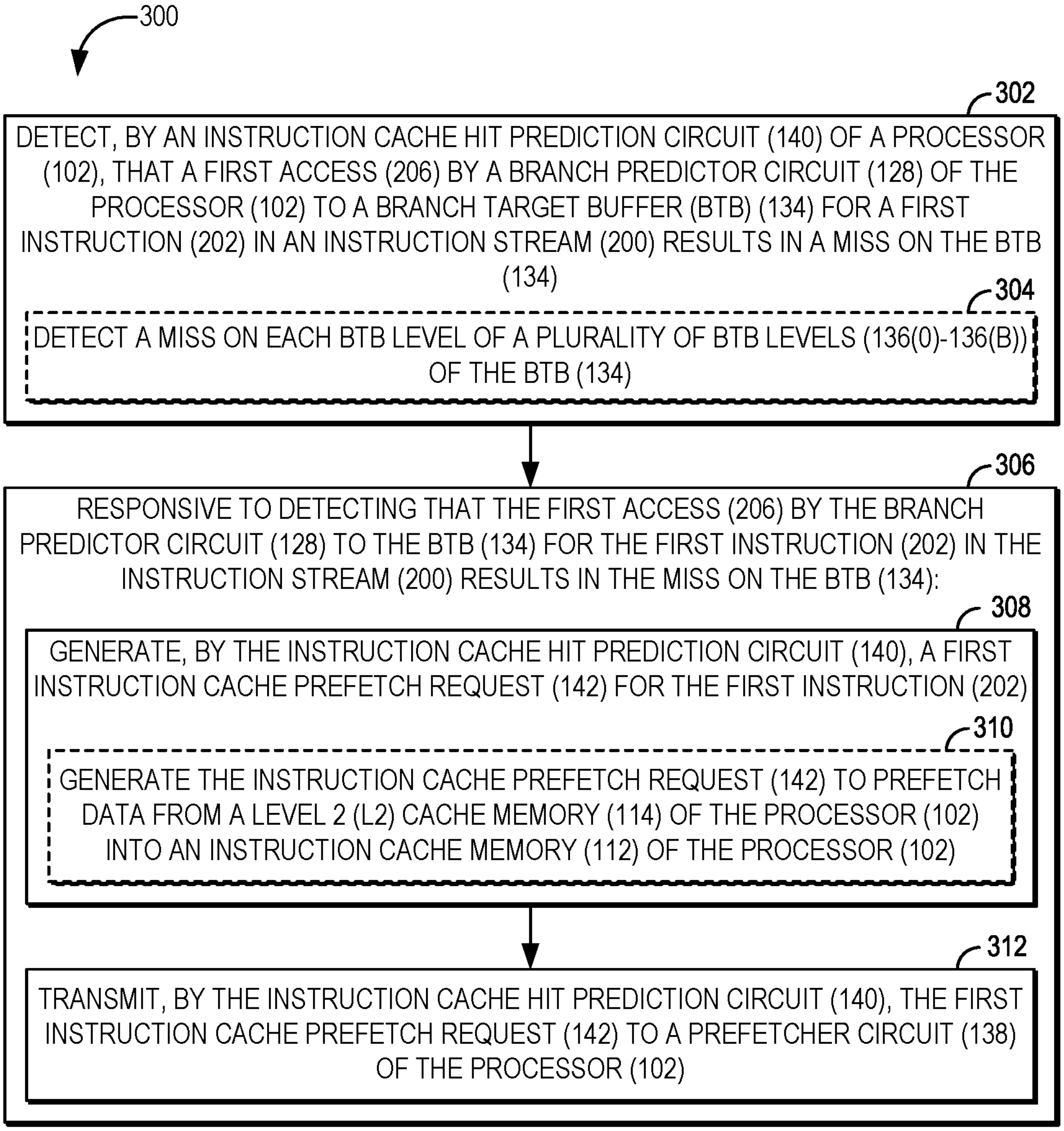
FIG. 3 is a flowchart illustrating exemplary operations performed by the instruction cache hit prediction circuit of FIGS. 1 and 2 for performing storage-free instruction cache hit prediction.

To illustrate exemplary operations performed by the instruction cache hit prediction circuit 140 of FIGS. 1 and 2 for performing storage-free instruction cache hit prediction, FIG. 3 provides a flowchart showing exemplary operations 300. Elements of FIGS. 1 and 2 are referenced in describing FIG. 3 for the sake of clarity. The exemplary operations 300 begin in FIG. 3 with the processor 102 (e.g., using the instruction cache hit prediction circuit 140 of FIGS. 1 and 2) detecting that a first access (e.g., the access 206 of FIG. 2) by a branch predictor circuit (e.g., the branch predictor circuit 128 of FIGS. 1 and 2) of the processor 102 to a BTB (e.g., the BTB 134 of FIGS. 1 and 2) for a first instruction in an instruction stream (e.g., the instruction 202 in the instruction stream 200 of FIG. 2) results in a miss on the BTB 134 (block 302). In some aspects, the operations of block 302 for detecting that the first access 206 results in a miss on the BTB 134 comprises the instruction cache hit prediction circuit 140 detecting a miss on each BTB level of a plurality of BTB levels (e.g., the BTB levels 136(0)-136(B) of FIGS. 1 and 2) of the BTB 134 (block 304).

In response to detecting that the first access 206 by the branch predictor circuit 128 to the BTB 134 for the first instruction 202 in the instruction stream 200 results in the miss on the BTB 134, the instruction cache hit prediction circuit 140 performs a series of operations (block 306). The instruction cache hit prediction circuit 140 generates a first instruction cache prefetch request (e.g., the instruction cache prefetch request 142 of FIGS. 1 and 2) for the first instruction 202 (block 308). Some aspects may provide that the operations of block 308 for generating the first instruction cache prefetch request 142 may comprise generating the instruction cache prefetch request 142 to prefetch data from an L2 cache memory (e.g., the L2 cache memory 114 of FIG. 1) of the processor 102 into an instruction cache memory (e.g., the instruction cache memory 112 of FIG. 1) of the processor 102 (block 310). The instruction cache hit prediction circuit 140 then transmits the first instruction cache prefetch request 142 to a prefetcher circuit (e.g., the prefetcher circuit 138 of FIGS. 1 and 2) of the processor 102 (block 312).

FIGS. 4A-4B provides a flowchart to illustrate in greater detail additional exemplary operations 400 for employing the instruction cache hit counters 208(0)-208(B) and the instruction cache miss counters 210(0)-210(B) when generating the instruction cache prefetch request 218 by the instruction cache hit prediction circuit 140 of FIGS. 1 and 2, according to some aspects. For the sake of clarity, elements of FIGS. 1 and 2 are referenced in describing FIGS. 4A-4B. It is to be understood that, in some aspects, some operations illustrated in FIGS. 4A-4B may be performed in an order other than that illustrated herein, or may be omitted. In FIG. 4A, the exemplary operations 400 begin with the instruction cache hit prediction circuit 140 detecting a second access (e.g., the access 212 of FIG. 2) by the branch predictor circuit 128 to a BTB level (e.g., the BTB level 136(0) of FIG. 2) of the plurality of BTB levels 136(0)-136(B) for a second instruction (e.g., the instruction 204 of FIG. 2) in the instruction stream 200 (block 402).

In response to detecting the second access 212, the instruction cache hit prediction circuit 140 performs a series of operations (block 404). The instruction cache hit prediction circuit 140 determines whether the second access 212 by the branch predictor circuit 128 to the BTB level 136(0) for the second instruction 204 in the instruction stream 200 results in a hit on the instruction cache memory 112 (block 406). If so, the instruction cache hit prediction circuit 140 increments an instruction cache hit counter (e.g., the instruction cache hit counter 208(0) of FIG. 2) for the BTB level 136(0) (block 408). The exemplary operations 400 then continue at block 410 of FIG. 4B. However, if the instruction cache hit prediction circuit 140 determines at decision block 406 that the second access 212 results in a miss on the instruction cache memory 112, the instruction cache hit prediction circuit 140 increments an instruction cache miss counter (e.g., the instruction cache miss counter 210(0) of FIG. 2) for the BTB level 136(0) (block 412). The exemplary operations 400 then continue at block 414 of FIG. 4B.

Referring now to FIG. 4B, the exemplary operations 400 continue with the instruction cache hit prediction circuit 140 next determining a ratio (e.g., the ratio 214 of FIG. 2) of a value of the instruction cache hit counter 208(0) for the BTB level 136(0) to a value of the instruction cache miss counter 210(0) for the BTB level 136(0) (block 414). The instruction cache hit prediction circuit 140 then determines whether the ratio 214 exceeds a miss rate threshold (e.g., the miss rate threshold 216 of FIG. 2) (block 416). If not, the exemplary operations 400 continue at block 410. However, if the instruction cache hit prediction circuit 140 determines at decision block 416 that the ratio 214 exceeds the miss rate threshold 216, the instruction cache hit prediction circuit 140 generates a second instruction cache prefetch request (e.g., the instruction cache prefetch request 218 of FIG. 2) for the second instruction 204 (block 418). The instruction cache hit prediction circuit 140 then transmits the second instruction cache prefetch request 218 to the prefetcher circuit 138 (block 420). In some aspects, the instruction cache hit prediction circuit 140 may subsequently reset the instruction cache hit counter 208(0) and the instruction cache miss counter 210(0) for the BTB level 136(0) (e.g., after expiration of a predefined time interval or after execution of a predefined number of instructions, as non-limiting examples) (block 410).

FIG. 5 is a block diagram of an exemplary processor-based system 500 that includes a processor 502 (e.g., a microprocessor) that includes an instruction processing circuit 504 that comprises an instruction cache hit prediction circuit (captioned as "ICHPC" in FIG. 5) 506 that corresponds in functionality to the instruction cache hit prediction circuit 140 of FIG. 1. The instruction processing circuit 504 can be the instruction processing circuit 104 in the processor 102 in FIG. 1 as an example. The processor-based system 500 can be the processor-based system 100 in FIG. 1 as an example. The processor-based system 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer.

In this example, the processor 502 represents one or more general-purpose processing circuits, such as a microprocessor, central processing unit, or the like. The processor 502 is configured to execute processing logic in instructions for performing the operations and steps discussed herein. In this example, the processor 502 includes an instruction cache 508 for temporary, fast access memory storage of instructions accessible by the instruction processing circuit 504. Fetched or prefetched instructions from a memory, such as from the system memory 510 over a system bus 512, are stored in the instruction cache 508. The instruction processing circuit 504 is configured to process instructions fetched into the instruction cache 508 and process the instructions for execution.

The processor 502 and the system memory 510 are coupled to the system bus 512 and can intercouple peripheral devices included in the processor-based system 500. As is well known, the processor 502 communicates with these other devices by exchanging address, control, and data information over the system bus 512. For example, the processor 502 can communicate bus transaction requests to a memory controller 514 in the system memory 510 as an example of a slave device. Although not illustrated in FIG. 5, multiple system buses 512 could be provided, wherein each system bus constitutes a different fabric. In this example, the memory controller 514 is configured to provide memory access requests to a memory array 516 in the system memory 510. The memory array 516 is comprised of an array of storage bit cells for storing data. The system memory 510 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 512. As illustrated in FIG. 5, these devices can include the system memory 510, one or more input device(s) 518, one or more output device(s) 520, a modem 522, and one or more display controllers 524, as examples. The input device(s) 518 can include any type of input device, including but not limited to input keys, switches, voice processors, etc. The output device(s) 520 can include any type of output device, including but not limited to audio, video, other visual indicators, etc. The modem 522 can be any device configured to allow exchange of data to and from a network 526. The network 526 can be any type of network, including but not limited to a wired or wireless network, a private or public network, a local area network (LAN), a wireless local area network (WLAN), a wide area network (WAN), a BLUETOOTH™ network, and the Internet. The modem 522 can be configured to support any type of communications protocol desired. The processor 502 may also be configured to access the display controller(s) 524 over the system bus 512 to control information sent to one or more displays 528. The display(s) 528 can include any type of display, including but not limited to a cathode ray tube (CRT), a liquid crystal display (LCD), a plasma display, etc.

The processor-based system 500 in FIG. 5 may include a set of instructions 530 to be executed by the processor 502 for any application desired according to the instructions. The instructions 530 may be stored in the system memory 510, processor 502, and/or instruction cache 508 as examples of a non-transitory computer-readable medium 532. The instructions 530 may also reside, completely or at least partially, within the system memory 510 and/or within the processor 502 during their execution. The instructions 530 may further be transmitted or received over the network 526 via the modem 522, such that the network 526 includes the computer-readable medium 532.

While the computer-readable medium 532 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:

an instruction processing circuit configured to process an instruction stream comprising a plurality of instructions;

an instruction cache memory;

a prefetcher circuit; and a branch predictor circuit comprising a branch target buffer (BTB) and an instruction cache hit prediction circuit;

the instruction cache hit prediction circuit configured to:

detect that a first access by the branch predictor circuit to the BTB for a first instruction in the instruction stream results in a miss on the BTB; and responsive to detecting that the first access by the branch predictor circuit to the BTB for the first instruction in the instruction stream results in the miss on the BTB:

generate a first instruction cache prefetch request for the first instruction; and transmit the first instruction cache prefetch request to the prefetcher circuit; and the prefetcher circuit configured to:

responsive to receiving the first instruction cache prefetch request, prefetch the first instruction from a higher-level cache memory into the instruction cache memory without requesting the first instruction from the instruction cache memory.

2. The processor of claim 1, wherein:

the processor further comprises a Level 2 (L2) cache memory; and the higher-level cache memory is the L2 cache memory.

3. The processor of claim 1, wherein:

the BTB comprises a plurality of BTB levels; and the instruction cache hit prediction circuit is configured to detect that the first access by the branch predictor circuit to the BTB for the first instruction in the instruction stream results in the miss on the BTB by being configured to detect a miss on each BTB level of the plurality of BTB levels of the BTB.

4. The processor of claim 1, wherein:

each BTB level of a plurality of BTB levels of the BTB is associated with an instruction cache hit counter and an instruction cache miss counter; and the instruction cache hit prediction circuit is further configured to:

detect that a second access by the branch predictor circuit to the BTB level for a second instruction in the instruction stream results in a miss on the instruction cache memory; and responsive to detecting that the second access by the branch predictor circuit to the BTB level for the second instruction in the instruction stream results in the miss on the instruction cache memory:

determine a ratio of a value of the instruction cache hit counter for the BTB level to a value of the instruction cache miss counter for the BTB level;

determine that the ratio exceeds a miss rate threshold; and responsive to determining that the ratio exceeds the miss rate threshold:

generate a second instruction cache prefetch request for the second instruction; and transmit the second instruction cache prefetch request to the prefetcher circuit.

5. The processor of claim 4, wherein:

the instruction cache hit prediction circuit is further configured to:

detect that a third access by the branch predictor circuit to the BTB level for a third instruction in the instruction stream results in a hit on the instruction cache memory; and responsive to detecting that the third access by the branch predictor circuit to the BTB level for the third instruction in the instruction stream results in the hit on the instruction cache memory, increment the instruction cache hit counter for the BTB level.

6. The processor of claim 4, wherein the instruction cache hit prediction circuit is further configured to, further responsive to detecting that the second access by the branch predictor circuit to the BTB level for the second instruction in the instruction stream results in the miss on the instruction cache memory, increment the instruction cache miss counter for the BTB level.

7. The processor of claim 4, wherein the instruction cache hit prediction circuit is further configured to reset the instruction cache hit counter and the instruction cache miss counter for the BTB level.

8. A method for performing storage-free instruction cache hit prediction, comprising:

detecting, by an instruction cache hit prediction circuit of a processor, that a first access by a branch predictor circuit of the processor to a branch target buffer (BTB) for a first instruction in an instruction stream results in a miss on the BTB; and responsive to detecting that the first access by the branch predictor circuit to the BTB for the first instruction in the instruction stream results in the miss on the BTB:

generating, by the instruction cache hit prediction circuit, a first instruction cache prefetch request for the first instruction;

transmitting, by the instruction cache hit prediction circuit, the first instruction cache prefetch request to a prefetcher circuit of the processor; and responsive to receiving the first instruction cache prefetch request, prefetching, by the prefetcher circuit, the first instruction from a higher-level cache memory into an instruction cache memory of the processor without requesting the first instruction from the instruction cache memory.

9. The method of claim 8, wherein the first instruction cache prefetch request comprises a prefetch request to prefetch data directly from a Level 2 (L2) cache memory of the processor into the instruction cache memory of the processor.

10. The method of claim 8, wherein:

the BTB comprises a plurality of BTB levels; and detecting that the first access by the branch predictor circuit to the BTB for the first instruction in the instruction stream results in the miss on the BTB comprises detecting a miss on each BTB level of the plurality of BTB levels of the BTB.

11. The method of claim 8, wherein:

each BTB level of a plurality of BTB levels of the BTB is associated with an instruction cache hit counter and an instruction cache miss counter; and the method further comprises:

detecting, by the instruction cache hit prediction circuit, that a second access by the branch predictor circuit to the BTB level for a second instruction in the instruction stream results in a miss on the instruction cache memory; and responsive to detecting that the second access by the branch predictor circuit to the BTB level for the second instruction in the instruction stream results in the miss on the instruction cache memory:

determining, by the instruction cache hit prediction circuit, a ratio of a value of the instruction cache hit counter for the BTB level to a value of the instruction cache miss counter for the BTB level;

determining, by the instruction cache hit prediction circuit, that the ratio exceeds a miss rate threshold; and responsive to determining that the ratio exceeds the miss rate threshold:

generating, by the instruction cache hit prediction circuit, a second instruction cache prefetch request for the second instruction; and transmitting, by the instruction cache hit prediction circuit, the second instruction cache prefetch request to the prefetcher circuit.

12. The method of claim 11, further comprising:

detecting, by the instruction cache hit prediction circuit, that a third access by the branch predictor circuit to the BTB level for a third instruction in the instruction stream results in a hit on the instruction cache memory; and responsive to detecting that the third access by the branch predictor circuit to the BTB level for the third instruction in the instruction stream results in the hit on the instruction cache memory, incrementing, by the instruction cache hit prediction circuit, the instruction cache hit counter for the BTB level.

13. The method of claim 11, further comprising, further responsive to detecting that the second access by the branch predictor circuit to the BTB level for the second instruction in the instruction stream results in the miss on the instruction cache memory, incrementing, by the instruction cache hit prediction circuit, the instruction cache miss counter for the BTB level.

14. The method of claim 11, further comprising resetting, by the instruction cache hit prediction circuit, the instruction cache hit counter and the instruction cache miss counter for the BTB level.

15. A non-transitory computer-readable medium having stored thereon computer-executable instructions that, when executed, cause a processor to:

detect that a first access by a branch predictor circuit of the processor to a branch target buffer (BTB) for a first instruction in an instruction stream results in a miss on the BTB;

responsive to detecting that the first access by the branch predictor circuit to the BTB for the first instruction in the instruction stream results in the miss on the BTB:

generate a first instruction cache prefetch request for the first instruction; and transmit the first instruction cache prefetch request to a prefetcher circuit of the processor; and responsive to the first instruction cache prefetch request, prefetch the first instruction from a higher-level cache memory into an instruction cache memory of the processor without requesting the first instruction from the instruction cache memory.

16. The non-transitory computer-readable medium of claim 15, wherein the higher-level cache memory is a Level 2 (L2) cache memory of the processor.

17. The non-transitory computer-readable medium of claim 15, wherein:

the BTB comprises a plurality of BTB levels; and the computer-executable instructions cause the processor to detect that the first access by the branch predictor circuit to the BTB for the first instruction in the instruction stream results in the miss on the BTB by causing the processor to detect a miss on each BTB level of the plurality of BTB levels of the BTB.

18. The non-transitory computer-readable medium of claim 15, wherein:

each BTB level of a plurality of BTB levels of the BTB is associated with an instruction cache hit counter and an instruction cache miss counter; and the computer-executable instructions further cause the processor to:

detect that a second access by the branch predictor circuit to the BTB level for a second instruction in the instruction stream results in a miss on the instruction cache memory; and responsive to detecting that the second access by the branch predictor circuit to the BTB level for the second instruction in the instruction stream results in the miss on the instruction cache memory:

determine a ratio of a value of the instruction cache hit counter for the BTB level to a value of the instruction cache miss counter for the BTB level;

determine that the ratio exceeds a miss rate threshold; and responsive to determining that the ratio exceeds the miss rate threshold:

generate a second instruction cache prefetch request for the second instruction; and transmit the second instruction cache prefetch request to the prefetcher circuit.

19. The non-transitory computer-readable medium of claim 18, wherein the computer-executable instructions further cause the processor to:

detect that a third access by the branch predictor circuit to the BTB level for a third instruction in the instruction stream results in a hit on the instruction cache memory; and responsive to detecting that the third access by the branch predictor circuit to the BTB level for the third instruction in the instruction stream results in the hit on the instruction cache memory, increment the instruction cache hit counter for the BTB level.

20. The non-transitory computer-readable medium of claim 18, wherein the computer-executable instructions further cause the processor to, further responsive to detecting that the second access by the branch predictor circuit to the BTB level for the second instruction in the instruction stream results in the miss on the instruction cache memory, increment the instruction cache miss counter for the BTB level.

* * * * *